United States Patent
Simonneau et al.

(10) Patent No.: US 9,203,542 B2
(45) Date of Patent: Dec. 1, 2015

(54) OPTICAL NODE FOR SWITCHING SIGNALS BETWEEN OPTICAL FIBERS

(75) Inventors: Christian Simonneau, Villejuif (FR); Francesco Vacondio, Paris (FR)

(73) Assignee: Alcatel Lucent, Boulogne-Billancourt (FR)

(*) Notice: Subject to any disclaimer, the term of this patent is extended or adjusted under 35 U.S.C. 154(b) by 68 days.

(21) Appl. No.: 14/241,241

(22) PCT Filed: Sep. 14, 2012

(86) PCT No.: PCT/EP2012/068061
§ 371 (c)(1),
(2), (4) Date: Feb. 26, 2014

(87) PCT Pub. No.: WO2013/041456
PCT Pub. Date: Mar. 28, 2013

(65) Prior Publication Data
US 2014/0219657 A1 Aug. 7, 2014

(30) Foreign Application Priority Data
Sep. 22, 2011 (EP) .................................. 11306200

(51) Int. Cl.
*H04J 14/02* (2006.01)
*H04Q 11/00* (2006.01)

(52) U.S. Cl.
CPC ............ *H04J 14/02* (2013.01); *H04Q 11/0005* (2013.01); *H04Q 2011/0016* (2013.01); *H04Q 2011/0024* (2013.01); *H04Q 2011/0052* (2013.01); *H04Q 2011/0058* (2013.01); *H04Q 2011/0075* (2013.01)

(58) Field of Classification Search
None
See application file for complete search history.

(56) References Cited

U.S. PATENT DOCUMENTS

2010/0014863 A1   1/2010   Zami et al.

FOREIGN PATENT DOCUMENTS

| JP | 2002534932 | 10/2002 |
|---|---|---|
| JP | 2010081374 | 4/2010 |

(Continued)

OTHER PUBLICATIONS

International Search Report for PCT/EP2012/068061, mailed Dec. 10, 2012.*

(Continued)

*Primary Examiner* — Darren E Wolf
(74) *Attorney, Agent, or Firm* — Patti & Malvone Law Group, LLC

(57) ABSTRACT

Proposed is an optical node that contains a number of A optical demultiplexers. Each demultiplexer is adapted to provide at its N output ports N incoming optical signals received from N optical cores of an incoming optical multi-core fiber. Furthermore, the optical node contains a number of B optical multiplexers. Each multiplexer is adapted to receive at its N input ports N outgoing optical signals and to insert the N outgoing optical signals into N optical cores of an outgoing multi-core fiber. The optical node is configurable to switch one of the incoming optical signals simultaneously onto B input ports of different multiplexers and to combine A of the incoming optical signals from A output ports of different demultiplexers onto a same input port of one of the multiplexers. Alternatively, N incoming signals are received from N different mode signals of a spatially multiplexed multi-mode fiber and then transmitted as N multi-mode signals into a spatially multiplexed multi-mode fiber.

8 Claims, 7 Drawing Sheets

(56) References Cited

FOREIGN PATENT DOCUMENTS

| JP | 2011082988 | 4/2011 |
|----|------------|--------|
| JP | 2012530386 | 11/2012 |
| JP | 2012531812 | 12/2012 |
| KR | 20040033202 | 4/2004 |
| KR | 20040096154 | 11/2004 |
| WO | 2010036268 | 4/2010 |

OTHER PUBLICATIONS

Sakaguchi, J. et al; 109-Tb/s (7×97×172-Gb/s SDM/WDM/PDM) QPSK Transmission through 16.8-km homogeneous multi-core fiber; PDPB6; OFC 2011; OSA/OFC/NFOEC 2011; 3 pages.

Zhu, B. et al; Space-, Wavelength-, Polarization-Divison Multiplexed Transmission of 56-Tb/s over a 76.8-km Seven-Core Fiber; PDPB7; OFC 2011; OSA/OFC/NFOEC 2011; 3 pages.

Maier, Guido; Generalized Space-Equivalent Analysis of Optical Cross-Connect Architectures; Proceedings IEEE Infocom 2001; Conference on Computer Communications, Twentieth Annual Joint Conference of the IEEE Computer and Communications Society (Cat. No. 01CH37213); PISCAT, vol. 1, Apr. 22, 2001; pp. 159-168; XP010538696; DOI: 10.1109/INFO.2001.916698; ISBN: 978-0-7803-7016-6.

Morioka, T.; Optical Communication Technologies—Challenges for Innovations; The Institute of Electronics, Information and Communication Engineers, May 2011, vol. 94, No. 5, pp. 412 to 416.

\* cited by examiner

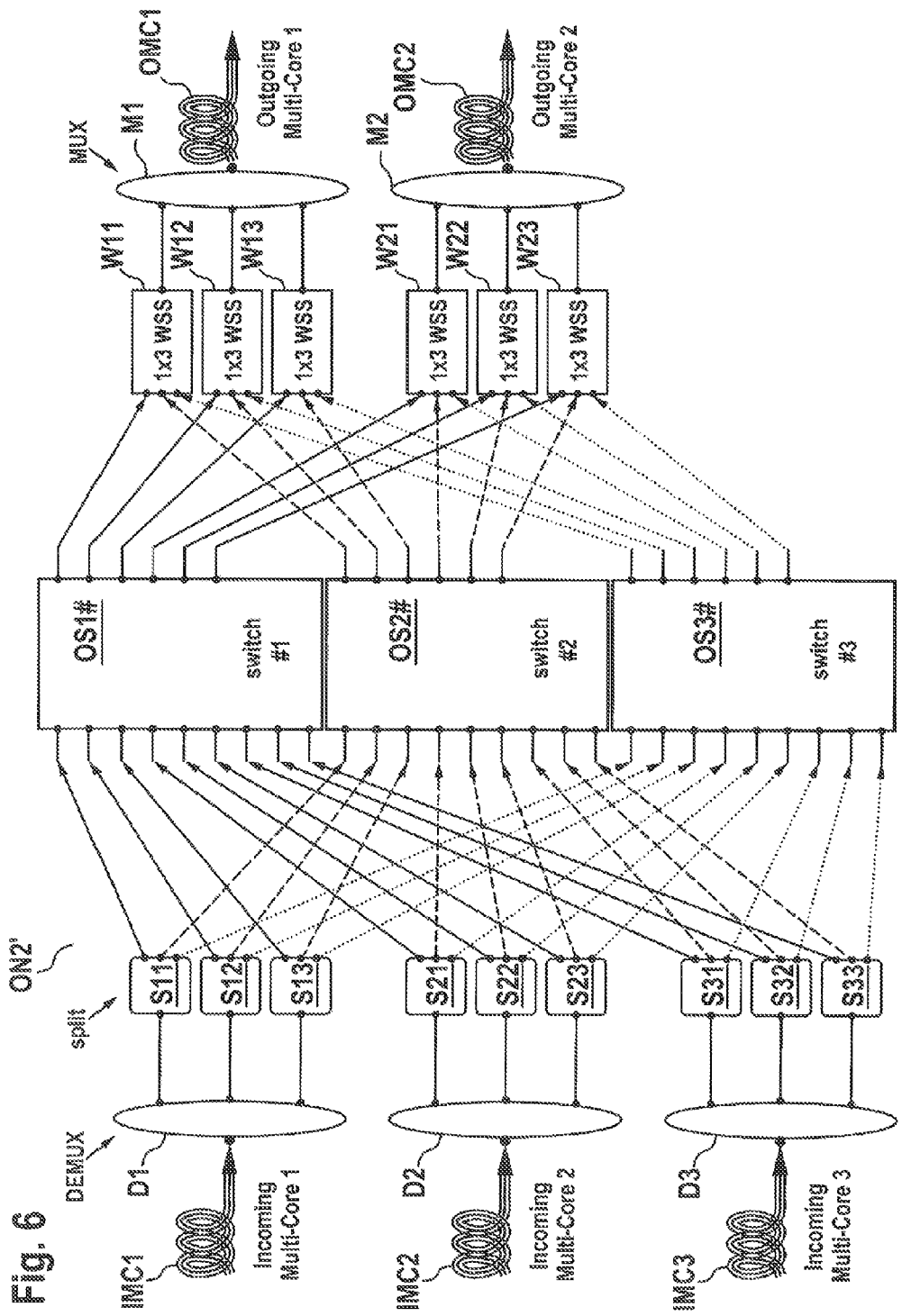

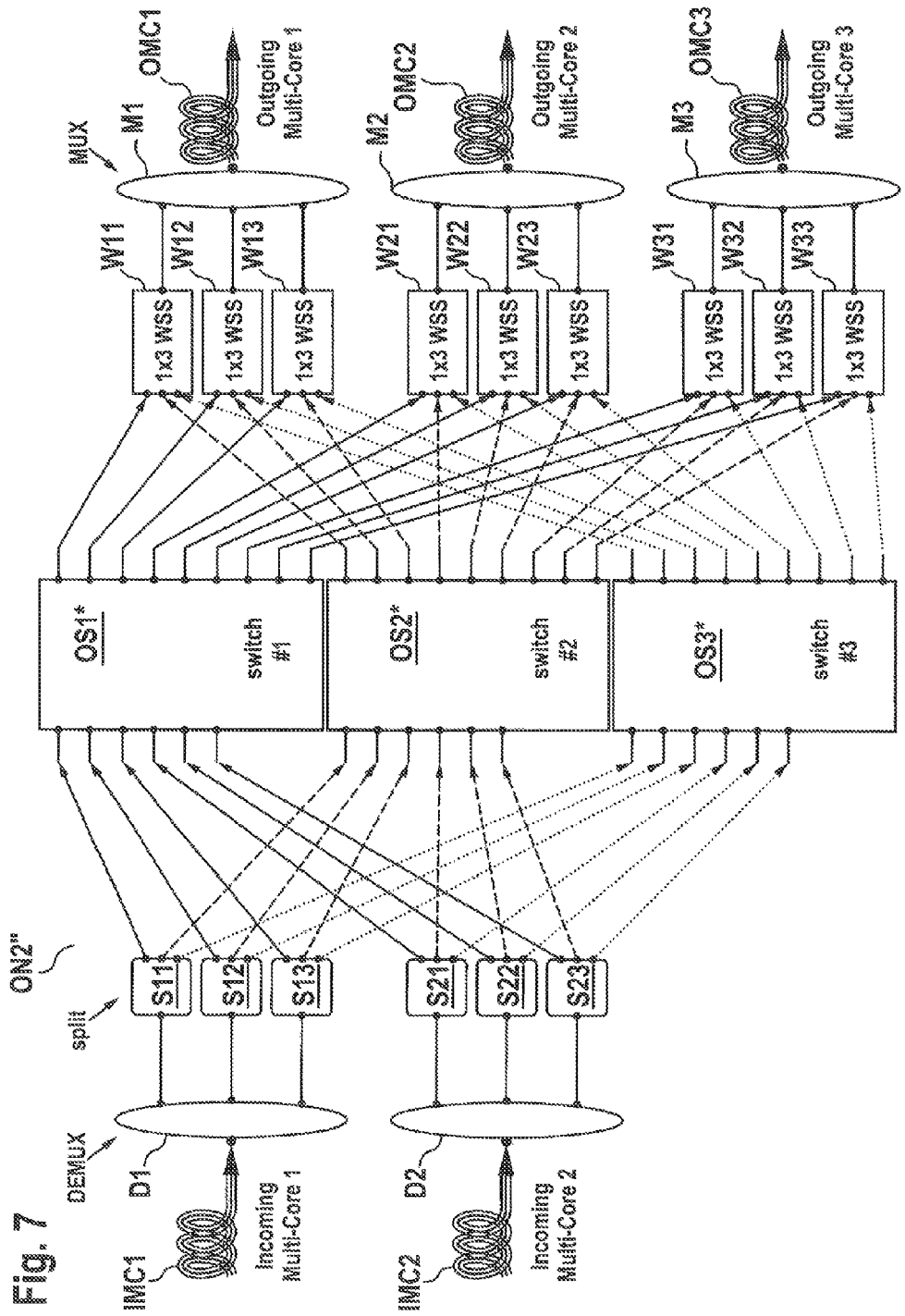

OPTICAL NODE FOR SWITCHING SIGNALS BETWEEN OPTICAL FIBERS

FIELD OF THE INVENTION

The invention relates to the field of telecommunications, in detail to an optical node for switching optical signals between optical fibers.

BACKGROUND

Known are optical nodes that switch signals between a number of incoming optical single-core fibers and a number of outgoing optical single-core fibers. Each single-core fiber connects the optical node with another optical network element. Within each incoming single-core fiber, an incoming optical signal may be present, which consists of different incoming optical wavelengths. Each optical wavelength may carry a respective data signal.

In order to switch a data signal with its respective incoming optical wavelength from one of the incoming single-core fibers onto one of the an outgoing single-core fibers, the optical node contains an architecture, in which each incoming optical signal of an incoming single-core fiber is split by a corresponding optical splitter onto a number of wavelength selective switches, wherein each outgoing single core-fiber is connected to a corresponding wavelength selective switch.

A wavelength selective switch then combines different optical wavelengths of different incoming optical signals received by the wavelength selective switch.

Thus, the fraction by which an optical splitter has to split an incoming optical signal is determined by the number of the outgoing single-core fibers. Furthermore, the number of ports, which a wavelength selective switch has to contain for receiving incoming optical signals, is determined by the number of the incoming single-core fibers.

SUMMARY

It is an aim of the invention to improve the known optical nodes for switching signals between optical fibers.

The proposed optical node contains a number of A optical demultiplexers. Each demultiplexer is adapted to provide at its N output ports N incoming optical signals received from N optical cores of an incoming optical multi-core fiber or received from N different multimode signals of a spatially multiplexed multi-mode fiber.

Furthermore, the optical node contains a number of B optical multiplexers. Each multiplexer is adapted to receive at its N input ports N outgoing optical signals and to insert the N outgoing optical signals into N optical cores of an outgoing multi-core fiber or to insert each of the outgoing optical signals as respective spatially multiplexed multi-mode signals into a spatially multiplexed multi-mode fiber.

The optical node is configurable
to switch one of the incoming optical signals simultaneously onto B input ports of different multiplexers,
and to combine A of the incoming optical signals from A output ports of different demultiplexers onto a same input port of one of the multiplexers.
For doing so, the optical node comprises
maximally M optical switches comprising maximally A*N input ports and maximally M*N output ports, wherein M is a maximum value of the numbers A and B, A*N optical splitters, each receiving one of the incoming signals and splitting the received incoming signal onto one input port of each of the optical switches,
and B*N wavelength selective switches, each receiving maximally M incoming optical signals from the output ports of the optical switches and combining the received incoming optical signals onto a same input port of one of the multiplexers.

In order to grasp the advantages of the proposed optical node over the known solutions, one has to take into consideration the following aspects:

Achieved is a switching of the incoming optical signals at wavelength level, such that an incoming optical wavelength received via a specific core of an incoming multi-core fiber can be switched onto B cores of B different outgoing multi-core fibers.

Since all cores of one outgoing multi-core fiber connect the optical node with one and the same optical network device, the incoming optical wavelength does not have to be switchable onto all B*N cores of all B outgoing multi-core fibers, but it is sufficient that this one incoming optical wavelength can be switched onto B cores of B different outgoing multi-core fibers. This is achieved by an architecture, in which the incoming optical signal is split only M times onto M input ports of M different switches. Furthermore, each of the wavelength selective switches receives maximally M incoming optical signals from the M optical switches.

If all cores of the different multi-core fibers were treated as if they were the cores of single-core fibers, as known from the prior art, then each incoming optical signal would have to be split B*N times onto all B*N wavelength selective switches of the B*N outgoing cores. Furthermore, each of the wavelength selective switches would have to contain A*N input ports for receiving and combining the A*N incoming optical signals of the A*N cores of the A incoming cores.

The advantages of the proposed optical node over the known solution is at least two fold. Each incoming optical signal split maximally M times, instead of splitting it B*N times, which leads to less optical power loss for each of the incoming optical signals.

Furthermore, each wavelength selective switch only needs to contain maximally M input ports for receiving incoming optical signals instead of A*N input ports, which leads to cheaper wavelength selective switches of lower complexity.

To compare the proposed optical node with a conventional optical node as known from the prior art, one may consider an example in which there are A=3 incoming multi-core fibers and B=3 outgoing multi-core fibers, each of them with N=3 cores. The maximum M of the values A and B is thus M=3.

According to the proposed optical node, each incoming signal is split maximally M=3 times, wherein according to the prior art each incoming signal would be split B*N=3*3=9 times, clearly leading to less optical power loss. Furthermore, according to the proposed optical node each wavelength selective switch contains maximally M=3 input ports, wherein according to the prior art an incoming signal would be split B*N=3*3=9 times, clearly leading to a less complex and cheaper wavelength selective switches.

Similar considerations as outlined above for individual cores of multi-core signals hold for the case of individual mode signals of multi-mode fibers.

BRIEF DESCRIPTION OF THE FIGURES

FIG. 6 shows the proposed optical node with a greater number of incoming than outgoing multi-core fibers according to the second embodiment.

FIG. 7 shows the proposed optical node with a greater number of outgoing than incoming multi-core fibers according to the second embodiment.

FIG. 1 shows an optical node O according to the prior art. At its input section, the node O contains a number of optical splitters S1, S2, S3, via which the node O receives from incoming optical single-core fibers ISC1, ISC2, ISC3 corresponding incoming optical signals, not shown explicitly in FIG. 1. At its output section, the node O contains a number of wavelength selective switches W1, W2, W3, each of which is connected to an outgoing optical single-core fiber OSC1, OSC2, OSC3.

Each incoming optical signal is split and distributed onto each wavelength selective switch W1, W2, W3. Thus, at each wavelength selective switch W1, W2, W3 contains as many input ports as there are incoming single-core fibers ISC1, ISC2, ISC3. At a wavelength selective switch W1, W2, W3, individual optical wavelengths are then selected from the received incoming optical signals and combined before transmitting them into a corresponding outgoing single-core fiber OSC1, OSC2, OSC3.

DESCRIPTION OF EMBODIMENTS

First Embodiment

Figure 2:
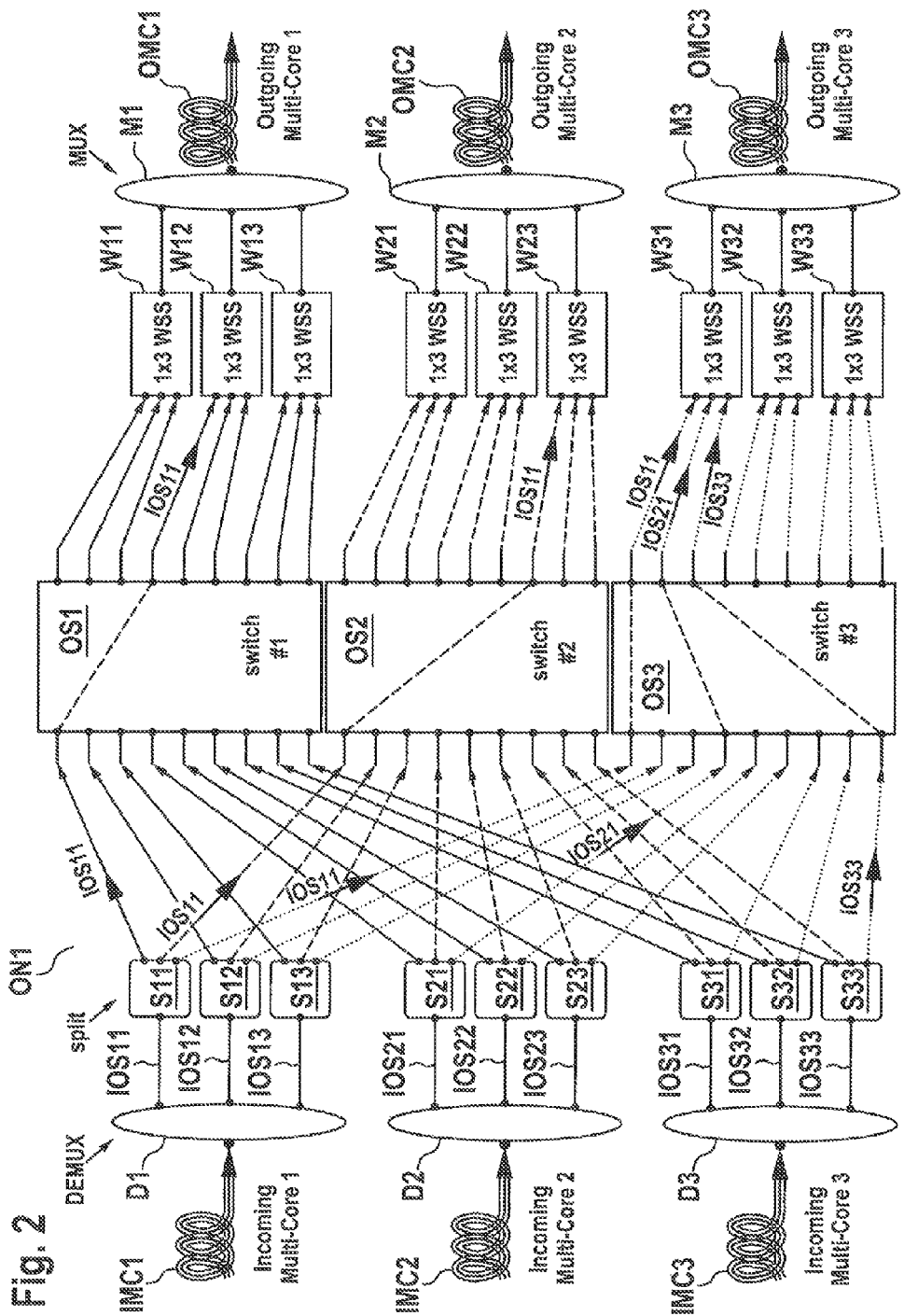
FIG. 2 shows a proposed optical node with a same number of incoming and outgoing multi-core fibers according to a first embodiment.

FIG. 2 shows the proposed optical node ON1 according to a first embodiment. In the shown example, the number A of incoming optical multi-core fibers IMC1, IMC2, IMC3 is equal to the number B of outgoing optical multi-core fibers OMC1, OMC2, OMC3. Without any limitation to the general disclosure of this application, the numbers A and B are chosen to the value A=3 and B=3 in the shown example. Each multi-core IMC1, IMC2, IMC3, OMC1, OMC2, OMC3 connects the node ON1 with a respective optical network device.

Each multi-core IMC1, IMC2, IMC3, OMC1, OMC2, OMC3 contains a number of N optical cores. Without any limitation to the general disclosure of this application, the numbers N is chosen to N=3 in the shown example.

Furthermore, an incoming multi-core IMC1, IMC2, IMC3 is connected to an input port of a respective optical spatial demultiplexer D1, D2, D3. Each demultiplexer D1, D2, D3 contains a number of N output ports.

The spatial demultiplexer D1 provides at its respective N output ports the N incoming optical signals IOS11, IOS12, IOS13, which are received from the respective N cores of the incoming multi-cores IMC1, IMC2, IMC3. Each of the N output ports of the demultiplexers D1 is connected to a respective optical splitter S11, ..., S13, to which the spatial demultiplexer D1 provide one of the N respective incoming optical signals IOS11, IOS12, IOS13. Similar considerations hold for the spatial demultiplexers D2 and D3, as shown in FIG. 2.

Each of the incoming optical signals IOS11, IOS33 may contain a set of optical wavelengths. An optical wavelength may represent a corresponding, individual data signal. It is an objective of the proposed node ON1, to achieve a solution in which one or more optical wavelengths can be switched from a core of an incoming multi-core IMC1, IMC2, IMC3 onto at least one core of each of the outgoing multi-cores OMC1, OMC2, OMC3.

The number of optical switches OS1, OS2, OS3, that are contained in the node ON1 is chosen equal to the number of outgoing multi-cores OMC1, OMC2, OMC3 as B=3. Each optical switch OS1, OS2, OS3 contains a number of input ports, which is chosen as A*N in dependence on the number A of incoming multi-core IMC1, IMC2, IMC3 and the number N of cores contained within a multi-core IMC1, IMC2, IMC3, OMC1, OMC2, OMC3. Each of the splitters S11, ..., S33 contains B=3 output ports, wherein each of the B=3 output ports is connected to one input port of a different one of the B optical switches OS1, OS2, OS3.

Each optical switch OS1, OS2, OS3 contains a number of output ports, which is chosen as A*N in dependence on the number A of incoming multi-core IMC1, IMC2, IMC3 and the number N of cores contained within a multi-core IMC1, IMC2, IMC3, OMC1, OMC2, OMC3. In the shown example, the number of output ports is A*N=3*3=9.

Each of the B=3 outgoing multi-cores OMC1, OMC2, OMC3 is connected to a respective one of B=3 optical spatial multiplexer M1, M2, M3. Each of the optical multiplexers M1, M2, M3 contains N=3 input ports. The optical multiplexers M1, M2, M3 are adapted to receive at their N input ports respective optical signals and to insert each of these received optical signals into a respective one of the N optical cores of the outgoing multi-cores OMC1, OMC2, OMC3.

Each of the input ports of the optical multiplexers M1, M2, M3 is connected to a respective one of N*B=9 wavelength selective switches W11, ..., W33. Each wavelength selective switch W11, ..., W33 contains A=3 input ports via which A=3 respective optical signals can be received. A wavelength selective switch W11, ..., W33 is adapted to select optical wavelengths from the optical signals that are received via the A input ports, and to combine the selected optical wavelengths as an outgoing optical signal. This outgoing optical signal is then provided at the output port of the wavelength selective switch W11, ..., W33 to that input port of the multiplexer M1, M2, M3, to which it is connected. All input ports of all wavelength selective switches W11, W12, W13, which are connected via a multiplexer M1 to a same outgoing multi-core OMC1, are connected to output ports of a same respective optical switch OS1. Same considerations hold for the input ports of the wavelength selective switches W21, W22, W23 with regard to the optical switch OS2, as well as the wavelength selective switches W31, W32, W33 with regard to the optical switch OS3.

The architecture of the node ON1 is such, that one or more optical wavelengths of a specific optical signal received from one of the cores of an incoming multi-core IMC1, IMC2, IMC3 can be switched onto B=3 different cores of B=3 different outgoing multi-cores OMC1, OMC2, OMC3. For example, as shown in FIG. 2, one or more optical wavelengths of the incoming signal IOS11 can be switched via the switch OS1 and the wavelength selective switch W12 onto a core of the outgoing multi-core OMC1, via the switch OS2 and the wavelength selective switch W23 onto a core of the outgoing multi-core OMC2,
and via the switch OS3 and the wavelength selective switch W31 onto a core of the outgoing multi-core OMC3.

Furthermore, with the architecture of the node ON1 it is possible, to combine within a specific core of an outgoing multi-core OMC1, OMC2, OMC3 optical wavelengths of up to A=3 incoming signals that are received from A=3 cores of A=3 different incoming multi-cores IMC1, IMC2, IMC3. For example, as shown in FIG. 2, at the wavelength selective switch W31 the optical signals IOS11, IOS21 and IOS33 can be combined, by switching them via the switch OS3 onto the A=3 different input ports of the wavelength selective switch W31.

The proposed architecture of the node ON1 does not allow to switch one or more optical wavelengths of a specific optical signal received from one of the cores of an incoming multi-cores IMC1, IMC2, IMC3 onto different cores of a same outgoing multi-core. For example, as shown in the configuration of the node ON1 in FIG. 2, the signal IOS11 can be switched only onto one core of the outgoing multi-core OMC1 via the switch OS1 and the wavelength selective switch W12, but not onto any other cores of the outgoing multi-core OMC1. But since all cores of the multi-core OMC1 are connecting the node ON1 with one and the same other optical device, it is sufficient that one or more wavelengths of the incoming signal IOS11 can be switched onto one core of the outgoing multi-core OMC1. Although a switching of different wavelengths of the incoming signal IOS11 onto different cores of the outgoing multi-core OMC1 would allow a greater flexibility of switching, this is not necessary for the reasons mentioned above.

Figure 1:
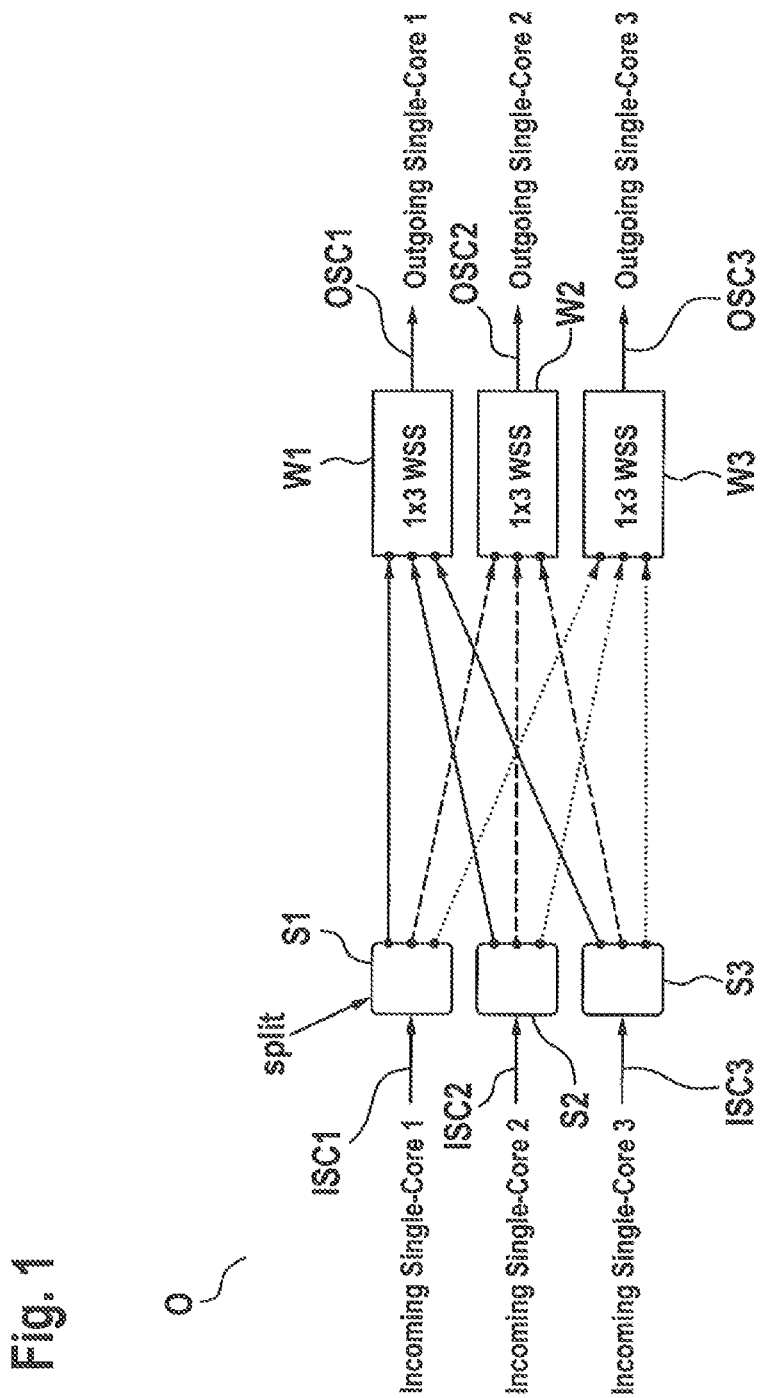
FIG. 1 shows an optical node as known from the prior art.

The advantage of the proposed node ON1 over a solution according to the prior art lies in the fact, that the proposed node ON1 achieves a switching of one or more optical wavelengths of a specific optical signal received from one of the cores of an incoming multi-core IMC1, IMC2, IMC3 onto B different cores of B different outgoing multi-cores OMC1, OMC2, OMC3 by means of a reduced architecture with a reduced number of technical subdevices. As previously outlined with regard to FIG. 1, a solution according to the prior art would use for each of the A*N incoming cores an optical splitter, which splits each incoming signal B*N=3*3=9 times onto each of the B*N wavelength selective switches W11, . . . , W33, which in turn would each need to contain A*N=3*3=9 input ports. The proposed node has an architecture, in which each of the A*N optical splitters S11, . . . , S33 needs to split an incoming signal only B=3 times, and in which the B*N wavelength selective switches W11, . . . , W33 need to contain only A=3 input ports. This is achieved by using B optical switches OS1, OS2, OS3, each with A*N input ports and A*N output ports. Thus, the proposed node contains an architecture which is less complex and thus also cheaper than a solution known from the prior art. Furthermore, the signals loss generated at each splitter S11, . . . , S33 is reduced, since a splitter S11, . . . , S33 needs to split an incoming optical signal only B times and not B*N times.

Figure 3:
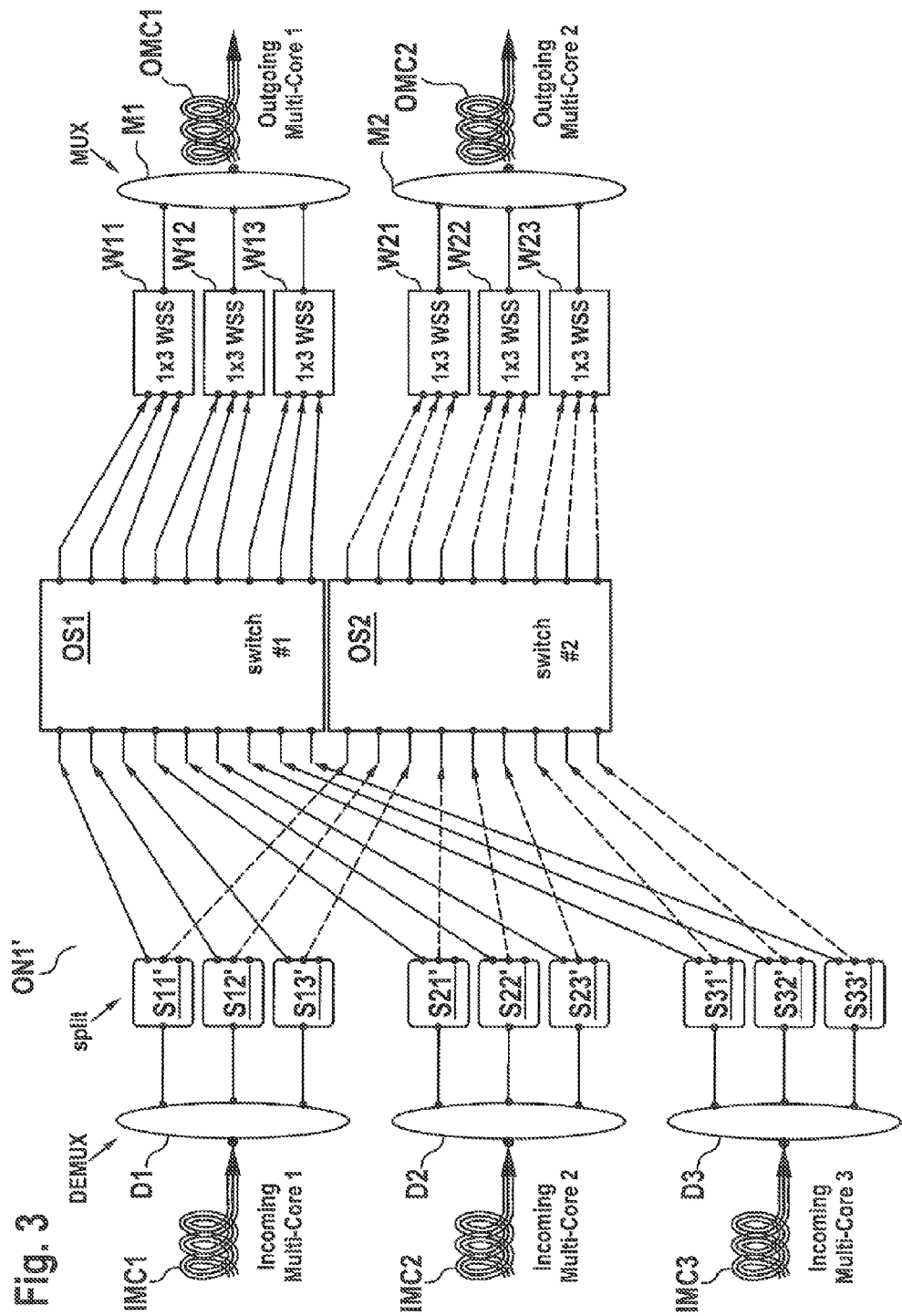
FIG. 3 shows the proposed optical node with a greater number of incoming than outgoing multi-core fibers according to the first embodiment.

FIG. 3 shows the proposed optical node ON1' according to the first embodiment in the case that the number A=3 of incoming multi-cores IMC1, IMC2, IMC3 is greater than the number B=2 of outgoing multi-cores OMC1, OMC2. The node ON1' of FIG. 3 contains all elements as the node ON1 of FIG. 2, except for
the outgoing multi-core OMC3,
the multiplexer M3,
the wavelength selective switches W31, . . . , W33, that are connected to the multiplexer M3,
the optical switch 0S3
and all connections between these elements.

Furthermore, the optical splitters S11, . . . , S13 contain only B=2 output ports, and thus split the incoming signals only B=2 times.

The architecture of the node ON1' is such, that one or more optical wavelengths of a specific optical signal received from one of the cores of an incoming multi-cores IMC1, IMC2, IMC3 can be switched onto B=2 different cores of B=2 different outgoing multi-cores OMC1, OMC2, OMC3. Furthermore, with the architecture of the node ON1' it is possible, to combine within a specific core of an outgoing multi-core OMC1, OMC2 optical wavelengths of up to A=3 incoming signals that are received from A=3 cores of A=3 different incoming multi-cores IMC1, IMC2, IMC3.

Figure 4:
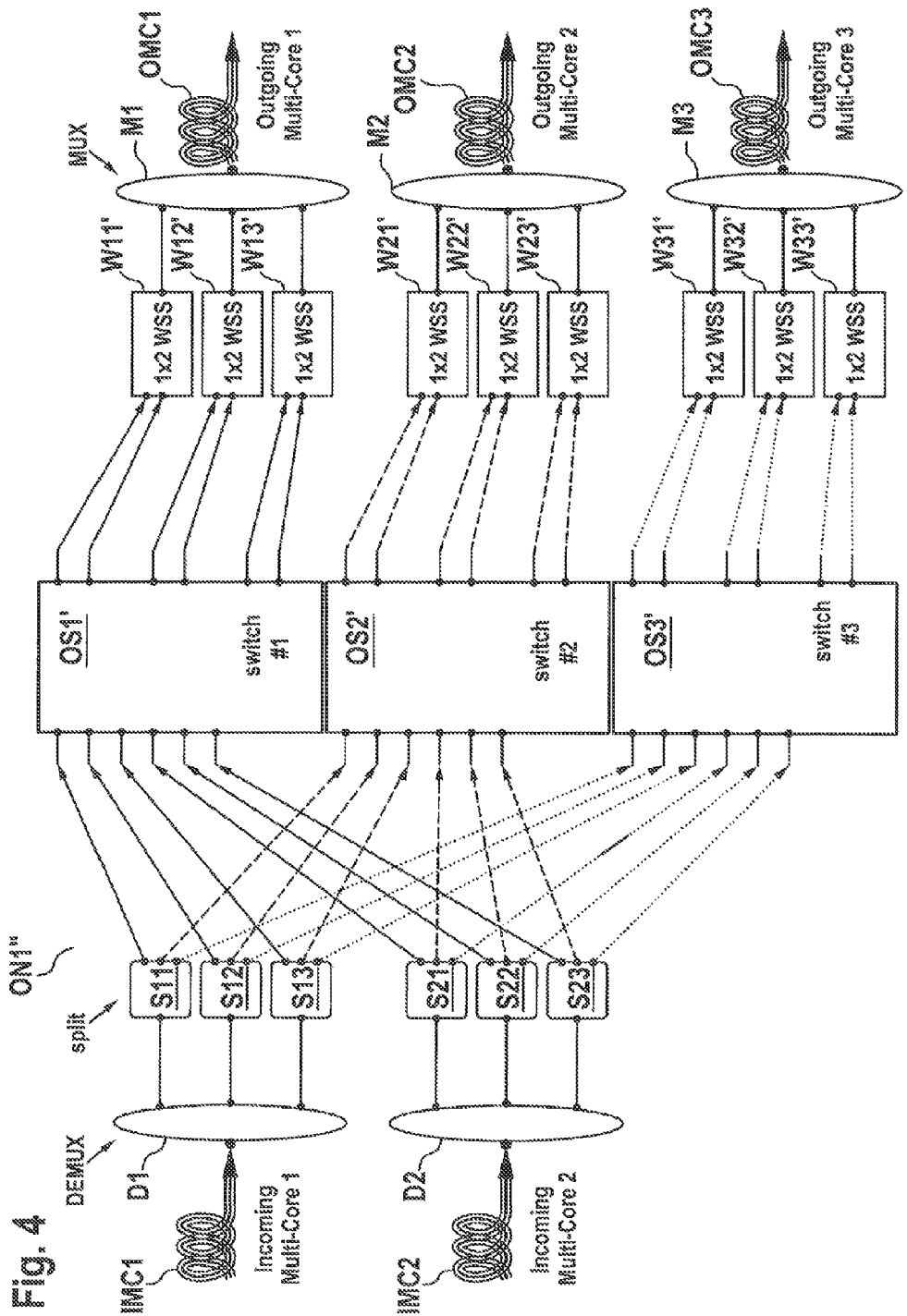
FIG. 4 shows the proposed optical node with a greater number of outgoing than incoming multi-core fibers according to the first embodiment.

FIG. 4 shows the proposed optical node ON1" according to the first embodiment in the case that the number B=3 of outgoing multi-cores OMC1, OMC2, OMC3 is greater than the number A=2 of incoming multi-cores IMC1, IMC2. The node ON1" of FIG. 4 contains all elements as the node ON1 of FIG. 2, except for
the incoming multi-core IMC3,
the demultiplexer D3,
the splitters S31, . . . , S33, that are connected to the demultiplexer D3,
the optical switch SS3
and all connections between these elements.

Furthermore, the optical switches OS1', OS2', OS3' contain only A*N=2*3=6 input ports and output ports. Even furthermore, the wavelength selective switches W11', . . . , W33' contain only A=2 input ports.

The architecture of the node ON1" is such, that one or more optical wavelengths of a specific optical signal received from one of the cores of an incoming multi-cores IMC1, IMC2 can be switched onto B=3 different cores of B=3 different outgoing multi-cores OMC1, OMC2, OMC3. Furthermore, with the architecture of the node ON1" it is possible, to combine within a specific core of an outgoing multi-core OMC1, OMC2, OMC3 optical wavelengths of up to A=2 incoming signals that are received from A=2 cores of A=2 different incoming multi-cores IMC1, IMC2.

To summarize the disclosure of the nodes ON1, ON1' and ON1" of the first embodiment shown in the FIGS. 2, 3 and 4, a node ON1, ON1', ON1" is configurable
  to switch at least one of the incoming optical signals simultaneously onto B input ports of B different of multiplexers,
  and to combine A of the incoming optical signals from A output ports of different demultiplexers onto a same input port of one of the multiplexers.

For this, the node ON1, ON1', ON1" contains maximally B optical switches comprising maximally A*N input ports and maximally A*N output ports,
  A*N optical splitters, each adapted to receive one of the incoming signals and to split the received incoming signal maximally B times onto one input port of each of the B optical switches,
  and B*N wavelength selective switches, each adapted to receive maximally A incoming optical signals from the output ports of the optical switches and to combine the received incoming optical signals onto a respective same input port of one of the multiplexers.

In the above explanations of this first embodiment as outlined with regard to the FIGS. 2, 3 and 4, the fibers from which the incoming signals IOS11, . . . , IOS33 are received are multi-core fibers IMC1, IMC2, IMC3 and the fibers into which the signals are transmitted are also multi-core fibers OMC1, OMC2, OMC3. Alternatively, instead of receiving N incoming signals from a multi-core fiber with N cores, there may be N incoming signals with N individual modes received from a multi-mode fiber. Furthermore, instead of N signals being inserted into N respective cores of a multi-core fiber, there may be N signals inserted as N different mode signals with individual modes into a multi-mode fiber. In this case, a demultiplexer D1, D2, D3 connected to a multi-mode fiber contains at least N mode-converters for converting a mode-signal to a specific optical single-mode signal. Furthermore, a multiplexer M1, M2, M3 connected to a multi-mode fiber contains N mode converters for converting the N optical signals received from N wavelength selective switches into N optical signals with respective individual modes.

In order to compensate signal degradation and/or a reduction of optical signal power, one or more optical amplifiers may be contained in the proposed optical node. Such amplifiers may be placed before a demultiplexer D1, D2, D3, after a demultiplexer D1, D2, D3 and thus also before a splitter S11, . . . , S33, after a wavelength selective switch W11, . . . , W33 or after a multiplexer M1, M2, M3.

Second Embodiment

Figure 5:
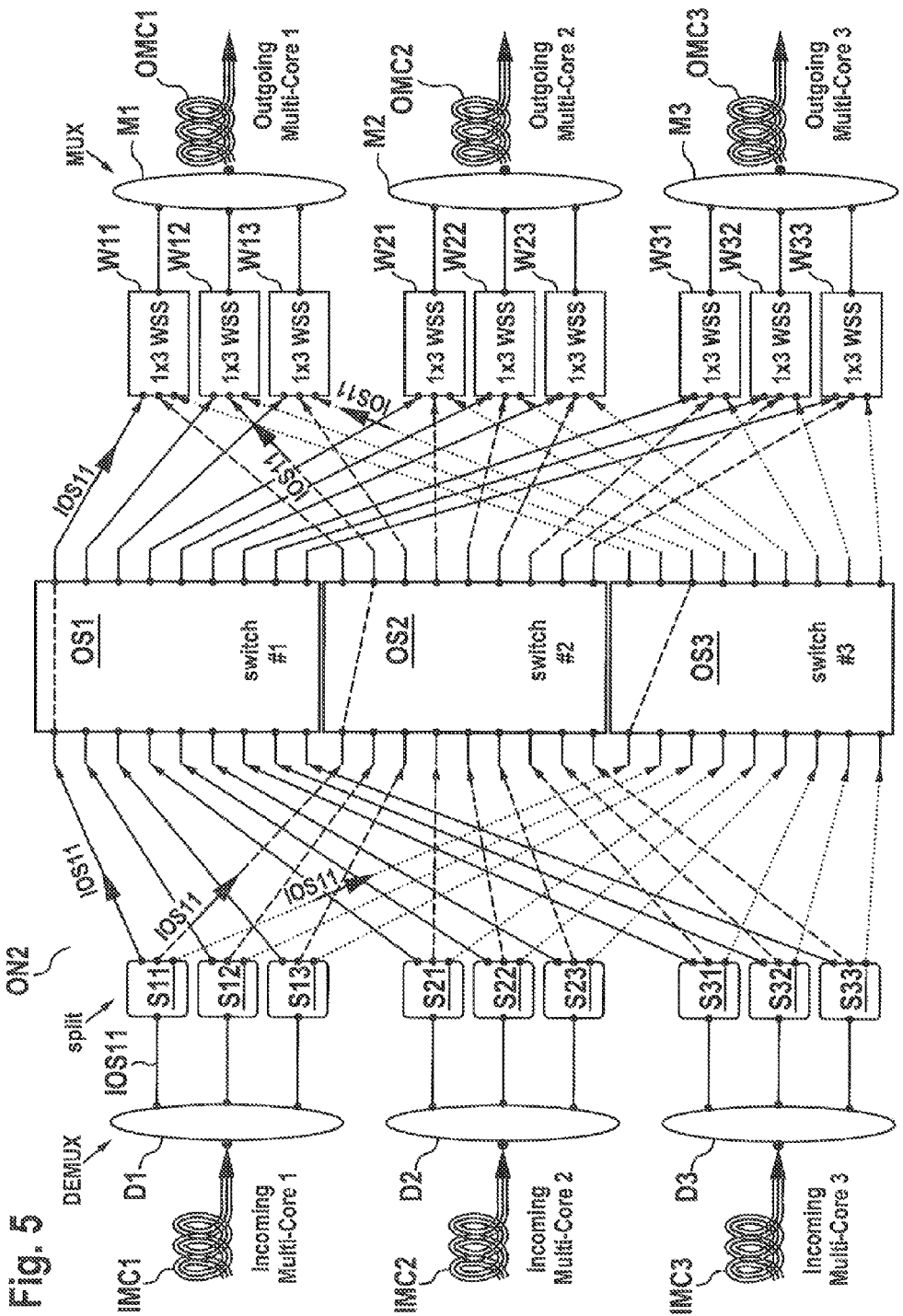
FIG. 5 shows the proposed optical node with a same number of incoming and outgoing multi-core fibers according to a second embodiment.

FIG. 5 shows the proposed optical node ON2 according to a second embodiment. In the shown example, the number A of incoming optical multi-core fibers IMC1, IMC2, IMC3 is equal to the number B of outgoing optical multi-core fibers OMC1, OMC2, OMC3.

FIG. 5 shows all elements as previously shown in FIG. 2 and as already described above except for one difference. This difference is, that not all A input ports of all wavelength selective switches W11, W12, W13, which are connected via a multiplexer M1 to a same outgoing multi-core OMC1, are connected to output ports of a same respective optical switch OS1. Instead, each input port of a wavelength selective switch W11, W12, W13 is connected to an input port of a different one of the optical switches OS1, OS2, O3.

The architecture of the node ON2 shown in FIG. 5 allows a switching of optical wavelengths as already described with regard to the node shown in FIG. 2. Furthermore, the node ON2 is configurable to switch one or more optical wavelengths of an incoming optical signals onto up to A=3 different cores of a same outgoing multi-core. For example, as shown in FIG. 5, the incoming optical signal IOS11 is switched
 via the optical switch OS1 onto the wavelength selective switch W11 connected to a first core of the outgoing multi-core OMC1,
 via the optical switch OS2 onto the wavelength selective switch W12 connected to a second core of the outgoing multi-core OMC1,
 and via the optical switch OS3 onto the wavelength selective switch W13 connected to a third core of the outgoing multi-core OMC1.

This kind of switching allows to distribute different wavelengths of a same incoming optical signal IOS11 onto different cores of a same outgoing multi-core OMC1, which is of advantage to achieve a load balancing of wavelengths between different cores of a same outgoing multi-core OMC1.

FIG. 6 shows the proposed optical node ON2' according to the second embodiment in the case that the number A=3 of incoming multi-cores IMC1, IMC2, IMC3 is greater than the number B=2 of outgoing multi-cores OMC1, OMC2. The node ON2' of FIG. 6 contains all elements as the node ON2 of FIG. 5, except for
 the outgoing multi-core OMC3,
 the multiplexer M3,
 the wavelength selective switches W31, . . . , W33, that are connected to the multiplexer M3,
 and all connections between these elements.

Furthermore, the optical switches OS1#, OS2#, OS3# contain only B*N=2*3=6 output ports.

The architecture of the node ON2' is such, that one or more optical wavelengths of a specific optical signal received from one of the cores of an incoming multi-cores IMC1, IMC2, IMC3 can be switched onto A=3 different cores of B=2 different outgoing multi-cores OMC1, OMC2. Furthermore, with the architecture of the node ON2' it is possible, to combine within a specific core of an outgoing multi-core OMC1, OMC2 optical wavelengths of up to A=3 incoming signals that are received from A=3 cores of A=3 different incoming multi-cores IMC1, IMC2, IMC3.

Furthermore, the node ON2' is configurable also to switch one or more optical wavelengths of an incoming optical signals onto up to A=3 different cores of a same outgoing multi-core. This kind of switching allows to distribute different wavelengths of a same incoming optical signal onto different cores of a same outgoing multi-core, which is of advantage to achieve a load balancing of wavelengths between different cores of a same outgoing multi-core.

FIG. 7 shows the proposed optical node ON2" according to the second embodiment in the case that the number B=3 of outgoing multi-cores OMC1, OMC2, OMC3 is greater than the number A=2 of incoming multi-cores IMC1, IMC2. The node ON2" of FIG. 7 contains all elements as the node ON2 of FIG. 5, except for
 the incoming multi-core IMC3,
 the demultiplexer D3,
 the splitters S31, . . . , S33
 and all connections between these elements. Furthermore, the optical switches OS1*, OS2*, OS3* contain only A*N=2*3=6 input ports.

The architecture of the node ON2" is such, that one or more optical wavelengths of a specific optical signal received from one of the cores of an incoming multi-cores IMC1, IMC2 can be switched onto B=3 different cores of B=3 different outgoing multi-cores OMC1, OMC2, OMC3. Furthermore, with the architecture of the node ON2" it is possible, to combine within a specific core of an outgoing multi-core OMC1, OMC2, OMC3 optical wavelengths of up to B=3 incoming signals that are received from A=2 cores of A=2 different incoming multi-cores IMC1, IMC2.

Furthermore, the node ON2" is configurable also to switch one or more optical wavelengths of an incoming optical signals onto up to B=3 different cores of a same outgoing multi-core. This kind of switching allows to distribute different wavelengths of a same incoming optical signal onto different cores of a same outgoing multi-core, which is of advantage to achieve a load balancing of wavelengths between different cores of a same outgoing multi-core.

To summarize the disclosure of the nodes ON2, ON2' and ON2" of the second embodiment shown in the FIGS. 5, 6 and 7, a node ON2, ON2' and ON2''' is configurable
 to switch a least one of the incoming optical signals simultaneously onto M input ports of M different of multiplexers,
 and to combine M of the incoming optical signals from M output ports of different demultiplexers onto a same input port of one of the multiplexers, wherein M is the maximum value of the numbers A and B.

For this, the node ON2, ON2' and ON2''' contains maximally M optical switches comprising maximally A*N input ports and maximally M*N output ports, A*N optical splitters, each adapted to receive one of the incoming signals and to split the received incoming signal maximally M times onto one input port of each of the M optical switches, and B*N wavelength selective switches, each adapted to receive maximally M incoming optical signals from the output ports of the optical switches and to combine the received incoming optical signals onto a respective same input port of one of the multiplexers.

In the above explanations of this second embodiment as outlined with regard to the FIGS. 5, 6 and 7, the fibers from which the incoming signals IOS11, ..., IOS33 are received are multi-core fibers IMC1, IMC2, IMC3 and the fibers into which the signals are transmitted are also multi-core fibers OMC1, OMC2, OMC3. Alternatively, instead of receiving N incoming signals from a multi-core fiber with N cores, there may be N incoming signals with N individual modes received from a multi-mode fiber. Furthermore, instead of N signals being inserted into N respective cores of a multi-core fiber, there may be N signals inserted as N different mode signals with individual modes into a multi-mode fiber. In this case, a demultiplexer D1, D2, D3 connected to a multi-mode fiber contains at least N mode-converters for converting a mode-signal to a specific optical single-mode signal. Furthermore, a multiplexer M1, M2, M3 connected to a multi-mode fiber contains N mode converters for converting the N optical signals received from N wavelength selective switches into N optical signals with respective individual modes.

In order to compensate signal degradation and/or a reduction of optical signal power, one or more optical amplifiers may be contained in the proposed optical node. Such amplifiers may be placed before a demultiplexer D1, D2, D3, after a demultiplexer D1, D2, D3 and thus also before a splitter S11, ..., S33, after a wavelength selective switch W11, ..., W33 or after a multiplexer M1, M2, M3.

Summary of Embodiments

To summarize the two embodiments described above, in all of these embodiments the proposed optical node contains a number of A optical demultiplexers, each adapted to provide at its N output ports respective incoming optical signals received from respective N optical cores of an incoming optical multi-core fiber, and a number of B optical multiplexers, each adapted to receive at its N input ports respective outgoing optical signals and to insert each of the outgoing optical signals into a respective one of N optical cores of an outgoing multi-core fiber.

In all of these embodiments the proposed optical node is configurable to switch at least one of the incoming optical signals simultaneously onto B input ports of different multiplexers, and to combine at least A of the incoming optical signals from A output ports of different of demultiplexers onto a same input port of one of the multiplexers.

In all of these embodiments, the optical node comprises maximally M optical switches comprising maximally A*N input ports and maximally M*N output ports, wherein M is a maximum value of the numbers A and B, A*N optical splitters, each adapted to receive one of the incoming signals and to split the received one incoming signal onto one input port of each of the optical switches, and B*N wavelength selective switches, each adapted to receive maximally M incoming optical signals from the output ports of the optical switches and to combine the received incoming optical signals onto a respective same input port of one of the multiplexers.

Furthermore, the optical splitters may contain additional drop output ports, not shown explicitly in the Figures, for additionally splitting the incoming signals onto a drop channel for dropping one or more optical wavelengths of an incoming signal at the optical node.

Even furthermore, the wavelength selective switches may contain additional add input ports, not shown explicitly in the Figures, for additionally adding at the optical node one or more optical wavelengths onto a combined optical signal that is the inserted into a core of an outgoing multi-core fiber.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention.

The invention claimed is:

1. An optical node, comprising:
a number A of optical demultiplexers, each demultiplexer adapted to provide at its N output ports respective incoming optical signals received from respective N optical cores of an incoming optical multi-core fiber or received from N multimode signals of a spatially multiplexed multi-mode fiber;
a number B of optical multiplexers, each multiplexer adapted to receive at its N input ports respective outgoing optical signals and to insert each of the outgoing optical signals into a respective one of N optical cores of an outgoing multi-core fiber or to insert each of the outgoing optical signals as respective spatially multiplexed multi-mode signals into a spatially multiplexed multi-mode fiber;
maximally M optical switches having maximally A*N input ports and maximally M*N output ports, wherein M is a maximum value of the numbers A and B;
A*N optical splitters each adapted to receive one of the incoming signals and to split the received one incoming signal onto one input port of each of the optical switches; and
B*N wavelength selective switches each wavelength selective switch adapted to receive maximally M incoming optical signals from output ports of the optical switches and to combine the received incoming optical signals onto a respective same input port of one of the multiplexers, wherein the optical node is configurable
- to switch at least one of the incoming optical signals simultaneously onto B input ports, each of the B input ports being on a different one of the multiplexers; and
- to combine at least A of the incoming optical signals from A optical demultiplexer output ports onto a same input port of one of the multiplexers, each of the A output ports being on a different one of the optical demultiplexers.

2. The optical node of claim 1, wherein:
all input ports of a wavelength selective switch are connected to output ports from a same one of the optical switches.

3. The optical node of claim 1, wherein:
a splitter contains B splitter output ports, and wherein each splitter output port is connected to one input port of a different one of the optical switches.

4. The optical node of claim 1, wherein:
each of the multiplexers contains N multiplexer input ports, and wherein each of the multiplexer input ports is connected to an output port of a respective one of the wavelength selective switches.

5. An optical node, comprising:
a number A of optical demultiplexers, each demultiplexer adapted to provide at its N output ports respective incoming optical signals received from respective N optical cores of an incoming optical multi-core fiber or received from N multimode signals of a spatially multiplexed multi-mode fiber;
   a number B of optical multiplexers, each multiplexer adapted to receive at its N input ports respective outgoing optical signals and to insert each of the outgoing optical signals into a respective one of N optical cores of an outgoing multi-core fiber or to insert each of the outgoing optical signals as respective spatially multiplexed multi-mode signals into a spatially multiplexed multi-mode fiber;

maximally M optical switches having maximally A*N input ports and maximally B*N output ports, wherein M is a maximum value of the numbers A and B;
A*N optical splitters each adapted to receive one of the incoming signals and to split the received one incoming signal onto one input port of each of the optical switches; and
B*N wavelength selective switches each wavelength selective switch adapted to receive maximally M incoming optical signals from output ports of the optical switches and to combine the received incoming optical signals onto a respective same input port of one of the multiplexers,
wherein the optical node is configurable
- to switch at least one of the incoming optical signals simultaneously onto M input ports, each of the M input ports being on a same one of the multiplexers; and
- to combine at least A of the incoming optical signals from A optical demultiplexer output ports onto the same input port of one of the multiplexers.

6. The optical node of claim 5, wherein:
each input port of a wavelength selective switch is connected to an output port of a different one of the optical switches.

7. The optical node of claim 5, wherein:
a splitter contains M output ports, and wherein each of the splitter output ports is connected to one input port of a different one of the optical switches.

8. The optical node of claim 5, wherein:
each of the multiplexers contains N multiplexer input ports, and wherein each of the multiplexer input ports is connected to an output port of a respective one of the wavelength selective switches.

* * * * *